US009525675B2

United States Patent
Zimmer et al.

(10) Patent No.: US 9,525,675 B2
(45) Date of Patent: Dec. 20, 2016

(54) ENCRYPTION KEY RETRIEVAL

(71) Applicant: McAfee, Inc., Santa Clara, CA (US)

(72) Inventors: Vincent J. Zimmer, Federal Way, WA (US); Igor Muttik, Berkhamsted (GB); Rajesh Poornachandran, Portland, OR (US); Jiewen Jacques Yao, Shanghai (CN); Mohan Atreya, Fremont, CA (US); Gopinatth Selvaraje, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 3 days.

(21) Appl. No.: 14/583,421

(22) Filed: Dec. 26, 2014

(65) Prior Publication Data

US 2016/0191481 A1    Jun. 30, 2016

(51) Int. Cl.
*G06F 21/00*    (2013.01)
*H04L 29/06*    (2006.01)

(52) U.S. Cl.
CPC ......... *H04L 63/062* (2013.01); *H04L 63/0428* (2013.01); *H04L 63/0435* (2013.01); *H04L 63/12* (2013.01); *H04L 63/123* (2013.01)

(58) Field of Classification Search
CPC combination set(s) only.
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 2002/0031225 A1* | 3/2002 | Hines | H04L 47/10 380/247 |
| 2008/0059797 A1* | 3/2008 | Tokuno | H04L 63/0853 713/171 |
| 2009/0031125 A1 | 1/2009 | Bjorn | |
| 2011/0271099 A1 | 11/2011 | Preiss et al. | |
| 2012/0297470 A1 | 11/2012 | Kwon | |
| 2012/0324233 A1 | 12/2012 | Nguyen et al. | |
| 2014/0047513 A1* | 2/2014 | van 't Noordende | G06F 21/44 726/4 |
| 2014/0317707 A1 | 10/2014 | Kim et al. | |

OTHER PUBLICATIONS

International Search Report and Written Opinion in International Application No. PCT/US2015-065141, mailed on Apr. 29, 2016, 13 pages.

* cited by examiner

*Primary Examiner* — Ghazal Shehni
(74) *Attorney, Agent, or Firm* — Patent Capital Group

(57) ABSTRACT

Particular embodiments described herein provide for an electronic device that can be configured to include an authentication module. The authentication module can be configured to receiving a request to access an electronic device, where the electronic device is separate from the authentication module, collect authentication data, communicate the authentication data to a network element, receive an authentication key, and communicate the authentication key to the electronic device.

24 Claims, 9 Drawing Sheets

ENCRYPTION KEY RETRIEVAL

TECHNICAL FIELD

This disclosure relates in general to the field of information security, and more particularly, to encryption key retrieval.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. In addition, a malicious operator that gains access to a system may be able to steal sensitive information or perform any number of other malicious actions. Hence, significant administrative challenges remain for protecting computers and computer networks from malicious and inadvertent exploitation by malicious software or malicious operators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1:
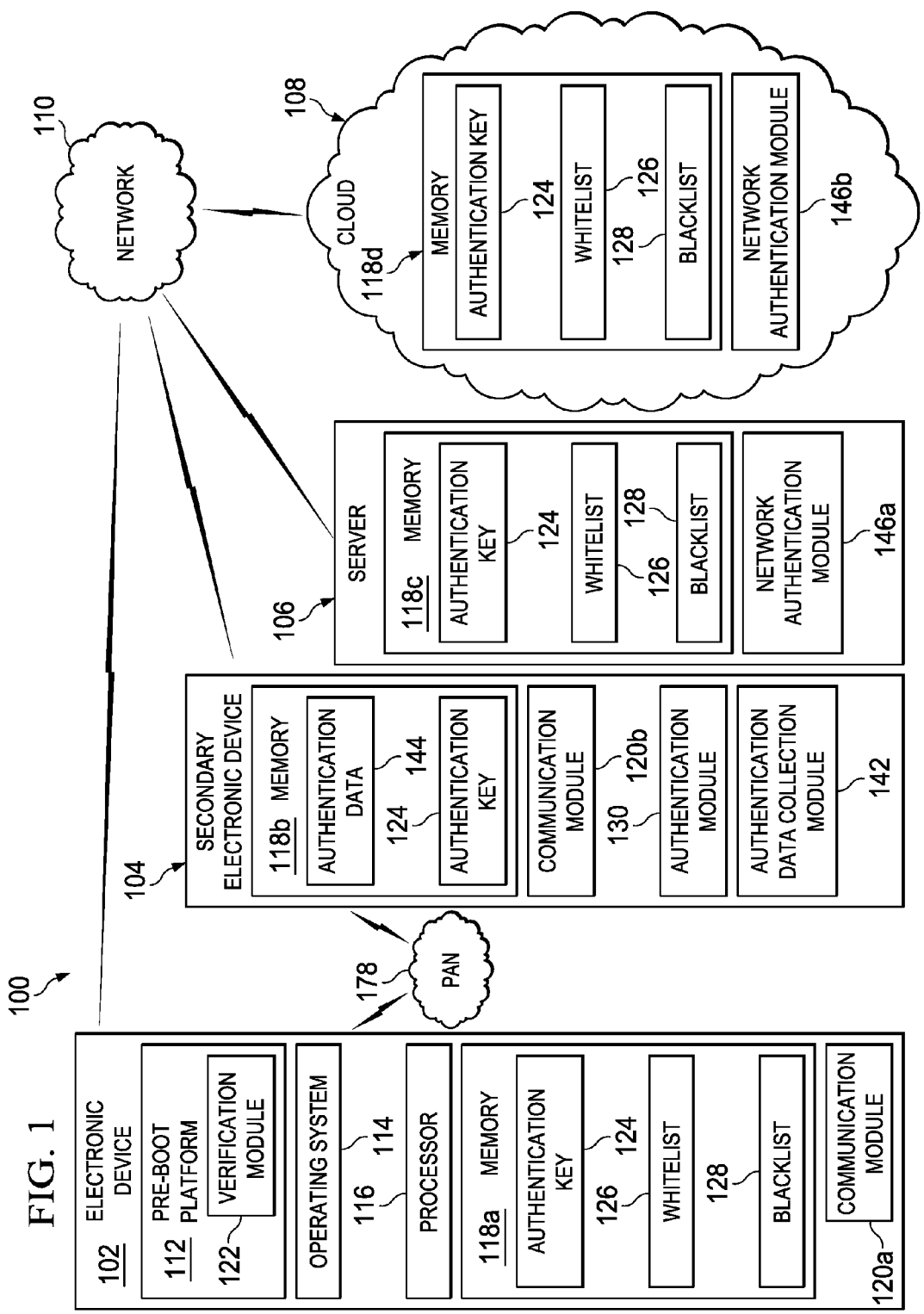
FIG. 1 is a simplified block diagram of a communication system for encryption key retrieval in accordance with an embodiment of the present disclosure.

FIG. 1 is a simplified block diagram of a communication system 100 for encryption key retrieval in accordance with an embodiment of the present disclosure. Communication system 100 can include a primary electronic device 102, a secondary electronic device 104, a server 106, and a cloud 108. Primary electronic device 102 can include a pre-boot platform 112, an operating system (OS) 114, a processor 116, memory 118a, and a communication module 120a. Pre-boot platform 112 can include a verification module 122. Memory 118a can include an authentication key 124 (after it is acquired as described below), a whitelist 126, and a blacklist 128. Secondary electronic device 104 can include memory 118b, an authentication module 130, a communication module 120b, and an authentication data collection module 142. Memory 118b can include authentication key 124 (after it is acquired as described below) and authentication data 144. Server 106 can include memory 118c and a network authentication module 146a. Memory 118c can include authentication key 124, whitelist 126, and blacklist 128. Cloud 108 can include a memory 118d and a network authentication module 146b. Memory 118d can include authentication key 124, whitelist 126, and blacklist 128. Primary electronic device 102, secondary electronic device 104, server 106, and cloud 108 can communication with each other using network 110. In an embodiment, primary electronic device 102 and secondary electronic device 104 can communicate with each other using a personal area network (PAN) network 178.

In example embodiments, communication system 100 can be configured to include a system that allows for retrieval of an encryption or authentication key. In an illustrative example, initially, authentication key 124 is not on or known to primary electronic device 102 or secondary electronic device 104. In another illustrative example, once obtained from server 106 or cloud 108, authentication key 124 is not persistently stored in primary electronic device 102 or secondary electronic device 104. When a user wants to activate or access a system or process (e.g., an OS, protected area memory, protected data storage area, protected media, etc.) that requires authentication key 124 (e.g., a Disk Encryption Key (DEK)), the user can provide authentication data to secondary electronic device 104. Secondary electronic device 104 can obtain authentication key 124 from server 106 or cloud 108, and secondary electronic device 104 can communicate authentication key 124 to primary electronic device 102.

In an embodiment, any number of secondary devices may be used, with each secondary device employing a set of suitable user authentication methods to communicate with server 106 or cloud 108. For example, authentication data from one or more secondary electronic devices may be required to obtain authentication key 124 from server 106 or cloud 108. In an illustrative embodiment, a first secondary electronic device may obtain voice authentication data related to the user and send the voice authentication data to server 106 or cloud 108 and a second electronic device may obtain finger print authentication data related to the user and send the finger print authentication data to server 106 or cloud 108. If the authentication data from each of the one or more secondary electronic devices is valid, then server 106 or cloud 108 can sent authentication key 124 to only one of the secondary electronic devices (e.g., the first secondary electronic device) or can send authentication key 124 to each of the one or more secondary electronic devices. In another example, server 106 or cloud 108 may send a unique authentication key 124 or a portion of authentication key 124 to each of the one or more secondary electronic devices and each unique authentication key 124 or each portion of authentication key 124 is required by primary electronic device 102. In yet another example, secondary electronic device 104 may collect multiple sets of authentication data for a user (e.g., voice authentication data, finger print authentication data, etc.) and secondary electronic device 102 can send the multiple sets of authentication data to server 106 or cloud 108 for verification.

The user can provide the authentication data to secondary electronic device 104 using authentication data collection module 142. The authentication data can include a passcode, biometric data (e.g., voice recognition, thumb or finger print scan, facial recognition, iris scan, etc.), or some other type of data that can be used to verify the user. In an embodiment, authentication module 130 can use the data collected by authentication data collection module 142 to verify the user. In another embodiment, secondary electronic device 104 can send the collected authentication data to server 106 or cloud 108 to verify the user.

After verifying the user or collecting the authentication data, secondary electronic device can send the data to server 106 or cloud 108 along with information identifying, primary electronic device 102, secondary electronic device 104, and a request for authentication key 124. Using network authentication module 146a or 146b, server 106 or cloud 108 respectively verifies that the authentication data is correct for the user, primary electronic device 102, and secondary electronic device 104. In an embodiment, server 106 or cloud 108 can compare the authentication data for the user and the information about primary electronic device 102 and secondary electronic device 104 to whitelist 126 or blacklist 128 or both. For example, authentication key 124 may only be sent if the authentication data and the information about primary electronic device 102 and secondary electronic device 104 matches one or more entries in whitelist 126. Alternatively, or additionally, the authentication key may be sent if the authentication data and the information about primary electronic device 102 and secondary electronic device 104 do not match one or more entries in blacklist 128.

After the authentication data is verified, server 106 or cloud 108 can send authentication key 124 to secondary electronic device 104. Secondary electronic device 104 can communicate authentication key 124 and information about secondary electronic device 104 to primary electronic device 102. Verification module 122 can verify that the correct secondary electronic device 104 has sent authentication key 124. In an embodiment, verification module 122 can compare the information about secondary electronic device 104 to whitelist 126 or blacklist 128 or both. Primary electronic device 102 can use authentication key 124 to access data in primary electronic device 102 and run processes such as operating system 114. Primary electronic device 102 and secondary electronic device 104 may communicate over PAN 178.

Elements of FIG. 1 may be coupled to one another through one or more interfaces employing any suitable connections (wired or wireless), which provide viable pathways for network (e.g., network 110) communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

For purposes of illustrating certain example techniques of communication system 100, it is important to understand the communications that may be traversing the network environment. The following foundational information may be viewed as a basis from which the present disclosure may be properly explained.

In many current systems, the traditional way to log into a system is to input a pass phrase. However, for proper security, a long pass phrase is needed and to input a long pass phrase can be annoying. In addition, with smart televisions, tablets, and wearable devices, there is typically not a keyboard to type in a passphrase as there is with a clamshell computer or desktop computer. Another way to log onto a system is to use a smart card or an RFID device. However, carrying a smart card or RFID with no other functionality is also not convenient and they can easily become lost or misplaced. Yet another way to log onto a system is to use biometrics, like a fingerprint or an iris scan. However, such technologies are often expensive and typically not ubiquitous.

Further, many systems lack a pre-OS authentication input capability. This lack of a pre-OS authentication input capability has proven to be a significant barrier to scaling like full disk encryption (FDE) that entails OS-absent user interaction. In addition, critical data including DEK (often encrypted by a user pass-phrase), a pre-boot application (PBA), data base of users, and token data are not encrypted, as all this data is required for the PBA prior to unlocking secured data. What is needed is a secure system and method of pre-OS authentication input capability that allows for an encryption key retrieval.

A communication system for encryption key retrieval, as outlined in FIG. 1, can resolve these issues (and others). In communication system 100 of FIG. 1, to perform encryption key retrieval, the system can be configured to include a secondary device (e.g., a smartphone) that is used to access an authentication key and communicate the authentication key to an electronic device to access a system or decrypt data. The secondary device is a physically separate device from the electronic device and can provide additional functionality other than encryption key retrieval. In an embodiment, encryption key retrieval is not the primary function of the secondary device. Authentication data is collected by the secondary device and sent to a network element such as a cloud or server that includes the authentication keying material. Remote placement of the network element separates the key material from attacks on the primary electronic device 102 and can make the communication system 100 more robust. By centrally managing and keeping long-term valuable assets like the authentication key off the primary electronic device and secondary electronic device and in the cloud or server, the cloud or server can assist in other factors such as verifying the authentication data of a user and any device requesting the authentication key.

Thus the system does not need to trust an electronic device's main OS to protect the authentication key long term. As a result, the authentication key is not persisted on the device (thus not exposed to hacks across power cycles) and instead can be ascertained via the secondary electronic device as a proxy to the cloud or server. User authentication data such as biometrics and authentication data associated with the secondary electronic device can be used to pair an authorized user with the secondary device and the primary electronic device executing disk encryption.

The authentication key does not persist on the primary electronic device or the secondary electronic device and thus is not exposed to hacks across power cycles. Instead, the authentication key can be ascertained via the secondary electronic device as a proxy to the cloud or server. This can improve user experience as the user does not have to go through the pain of keying in a very long pass-phrase, especially with touch based virtual keyboard devices or wearable devices. The cloud or server can assist with the key management and user identification and can manage pre-OS data and management information for purposes of recovery, protection, and management.

Turning to the infrastructure of FIG. 1, communication system 100 in accordance with an example embodiment is shown. Generally, communication system 100 can be implemented in any type or topology of networks. Network 110 represents a series of points or nodes of interconnected communication paths for receiving and transmitting packets of information that propagate through communication system 100. Network 110 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. PAN 178 may be a PAN that offers a communicative interface between primary electronic device 102 and secondary electronic device 104 that can vary from a few centimeters to a few meters. PAN 178 can include a Bluetooth network, Wireless USB network, Z-Wave network, ZigBee network, body area network, an INSTEON network, IrDA network, etc.

In communication system 100, network traffic, which is inclusive of packets, frames, signals (analog, digital or any combination of the two), data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications (e.g., over a cellular network) may also be provided in communication system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, primary electronic device 102, secondary electronic device 104, server 106, and cloud 108 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, each of primary electronic device 102, secondary electronic device 104, server 106, and cloud 108 can include memory elements for storing information to be used in the operations outlined herein. Each of primary electronic device 102, secondary electronic device 104, server 106, and cloud 108 may keep information in any suitable memory element (e.g., random access memory (RAM), read-only memory (ROM), erasable programmable ROM (EPROM), electrically erasable programmable ROM (EEPROM), application specific integrated circuit (ASIC), non-volatile memory (NVRAM), magnetic storage, magneto-optical storage, flash storage (SSD), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as primary electronic device 102, secondary electronic device 104, server 106, and cloud 108 may include software modules (e.g., communication modules 120a and 120b, verification module 122, authentication module 130, authentication data collection module 142, and network authentication modules 146a and 146b respectively) to achieve, or to foster, operations as outlined herein. These modules may be suitably combined in any appropriate manner, which may be based on particular configuration and/or provisioning needs. In some embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of primary electronic device 102, secondary electronic device 104, server 106, and cloud 108 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Primary electronic device 102 can be a network element and includes, for example, desktop computers, laptop computers, mobile devices, personal digital assistants, smartphones, tablets, wearables, or other similar devices. Secondary electronic device 104 can be a network element and includes, for example, laptop computers, mobile devices, personal digital assistants, smartphones, tablets, wearables, or other similar devices. In an embodiment, secondary electronic device 104 is a mobile electronic device that can be carried or travel with a user. Secondary electronic device 104 can be configured to perform or execute other activities or functions other than encryption key retrieval. In an embodiment, encryption key retrieval is not the primary function of secondary electronic device 104. Server 106 can be a network element such as a server or virtual server and can be associated with clients, customers, endpoints, or end users wishing to initiate a communication in communication system 100 via some network (e.g., network 110). The term 'server' is inclusive of devices used to serve the requests of clients and/or perform some computational task on behalf of clients within communication system 100. Although network authentication modules 146a and 146b are represented in FIG. 1 as being located in server 106 and cloud 108 respectively, this is for illustrative purposes only. Network authentication modules 146a and 146b could be combined or separated in any suitable configuration. Furthermore, network authentication modules 146a and 146b could be integrated with or distributed in another network accessible by secondary electronic device 104. Cloud 108 is configured to provide cloud services to primary electronic device 102 and secondary electronic device 104. Cloud services may generally be defined as the use of computing resources that are delivered as a service over a network, such as the Internet. The services may be distributed and separated to provide required support for primary electronic device 102, secondary electronic device 104, and server 106. For example, whitelist 126 and blacklist 128 may be operating as separate services and may reside on multiple electronic devices. Typically, compute, storage, and network resources are offered in a cloud infrastructure, effectively shifting the workload from a local network to the cloud network.

Figure 2:
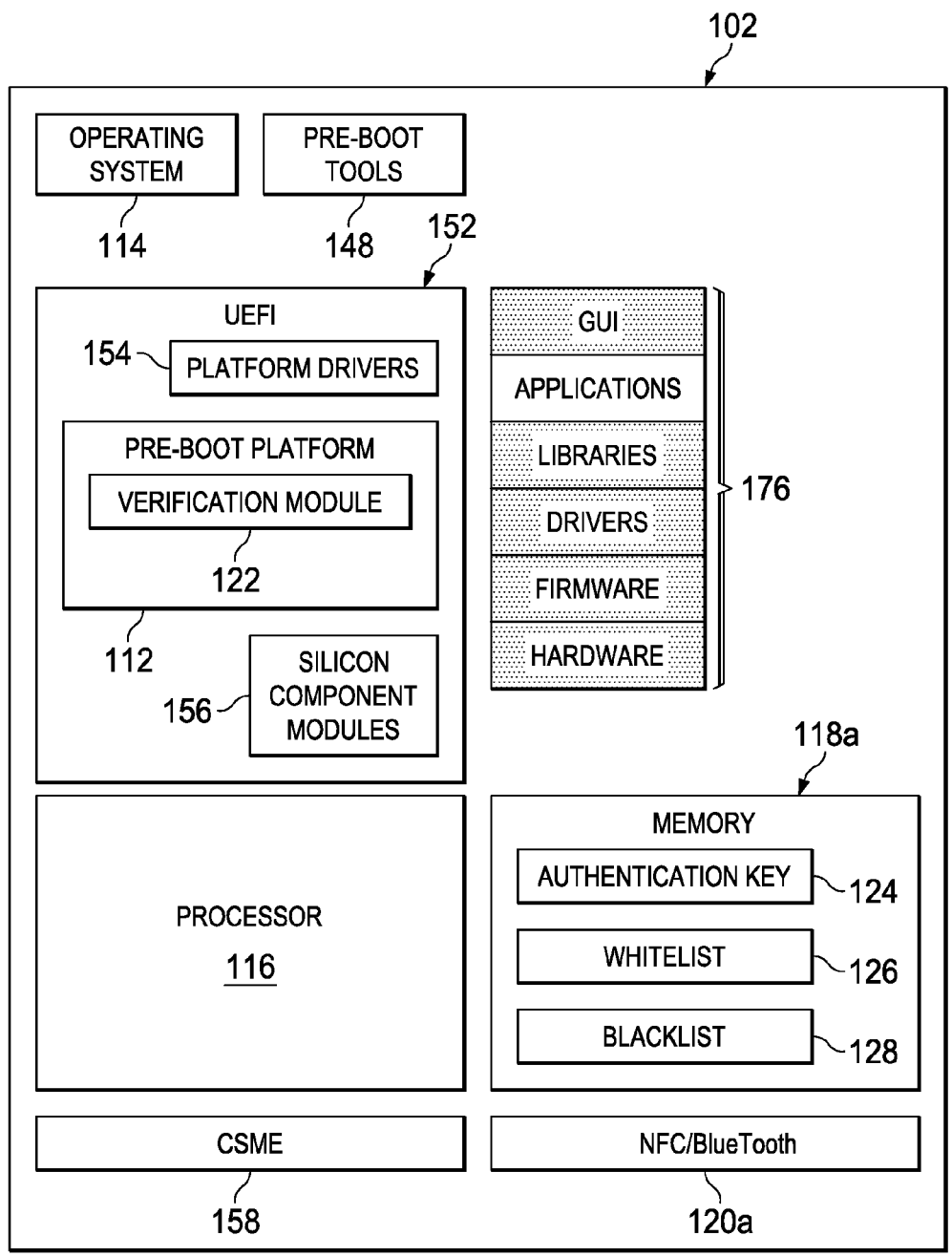
FIG. 2 is a simplified block diagram of a portion of a communication system for encryption key retrieval in accordance with an embodiment of the present disclosure.

Turning to FIG. 2, FIG. 2 is a simplified block diagram of a portion of communication system 100 for encryption key retrieval in accordance with an embodiment of the present disclosure. Primary electronic device 102 can include OS 114, processor 116, memory 118a, communication module 120a, pre-boot tools 148, a unified extensible firmware interface (UEFI) 152, a converged security manageability engine (CSME) 158, and supporting elements 176. UEFI 152 can include platform drivers 154, pre-boot platform 112, and silicon component modules 156. Supporting elements 176 can include a graphic user interface, one or more applications, libraries, drivers, firmware, hardware, etc. CSME 158 can be configured as a separate computer domain on a mother board that can facilitate communications using communication module 120a. For example, communication module 120a can be configured to allow pre-boot platform 112 to communicate with secondary electronic device 104 and obtain authentication key using an embedded radio such as near field communications (NFC), Bluetooth, etc. Silicon component modules 156 can be configured to initialize processor 116 (e.g., processor memory complex). Once processor 116 is initialized, platform drivers 154 can be configured the execute higher order functions, (e.g., enumerating input/output buses, PCI, USB, discovering storage, etc.) to allow a plurality of low level firmware drivers to have sufficient capabilities to publish UEFI interfaces so UEFI executables such as OS loaders, pre-boot tools 148, pre-boot platform 112, etc. can load and execute. Although the examples discuss UEFI, UEFI merely represents one illustrative example and other environments that run prior to the main OS and assist in the decryption of the main OS for Full Disk Encryption (FDE) usages may be used in communication system 100 (e.g., Open Firmware U-Boothttp, PC/AT BIOS, coreboot, etc.).

Figure 3:
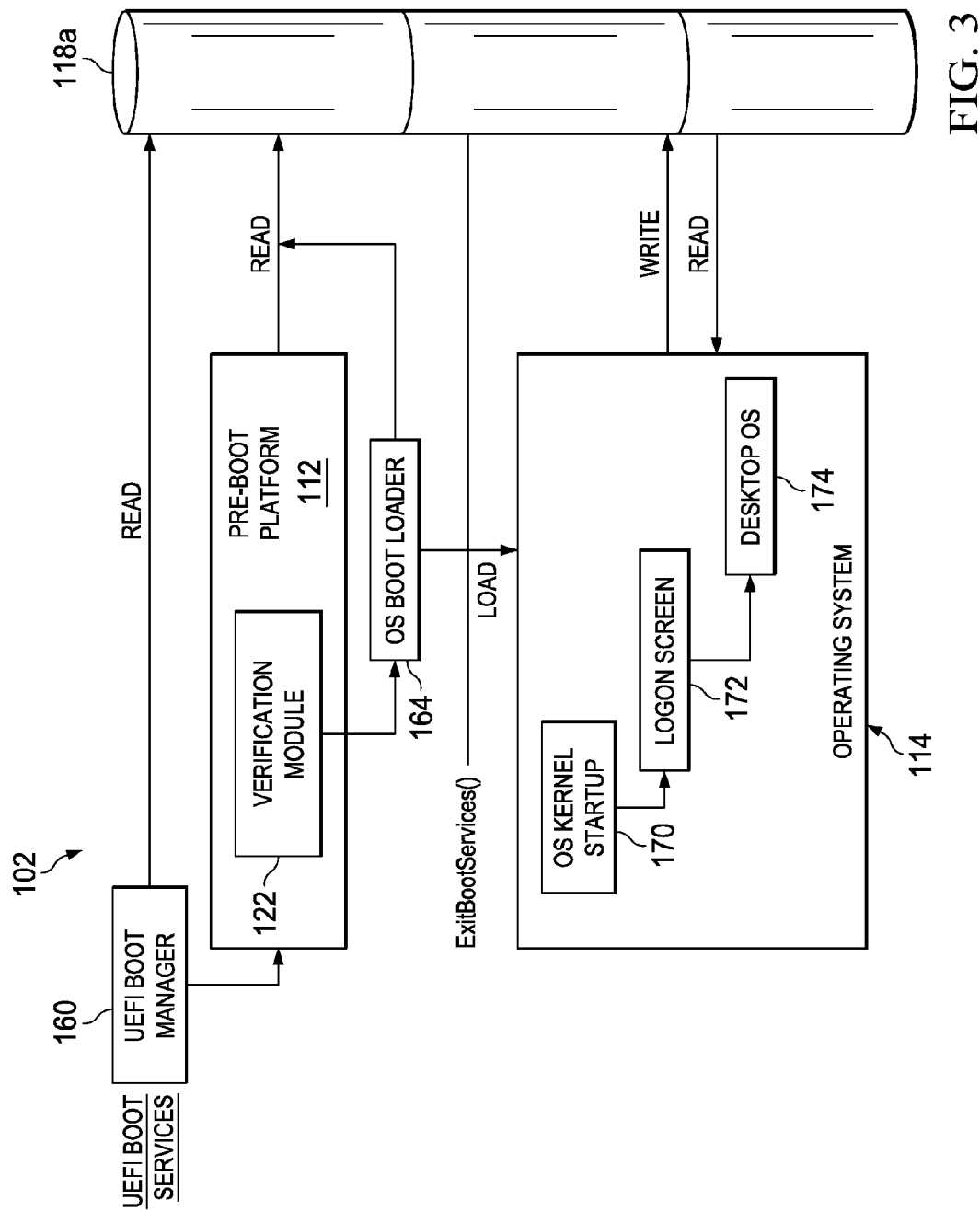
FIG. 3 is a simplified block diagram of a portion of a communication system for encryption key retrieval in accordance with an embodiment of the present disclosure.

Turning to FIG. 3, FIG. 3 is a simplified block diagram of a portion of communication system 100 for encryption key retrieval in accordance with an embodiment of the present disclosure. Primary electronic device 102 can include, pre-boot platform 112, OS 114, memory 118a, a UEFI boot manager 160, and an OS boot loader 164. OS 114 can include OS kernel startup 170, a logon screen 172, and a desktop OS 174. In an example process, UEFI boot manager 160 can become activated (e.g., a user turn on primary electronic device 102) and initialize or activate verification module 122. Verification module 122 can obtain authentication key 124 from secondary electronic device 104 (not shown) and verify authentication key 124 using memory 118a. In an embodiment, the source of authentication key 124 can be verified using whitelist 126 or blacklist 128 or both. After verification, verification module 122 can send authentication key 124 to OS boot loader 164. OS boot loader 164 can load OS 114 or some other system software for primary electronic device 102. Memory 118a can be an encryption drive such as an enclave, opal self-encrypting drive, in-line encryption, etc. that requires a key or authenticator to unlock the data in memory 118a.

Figure 4:
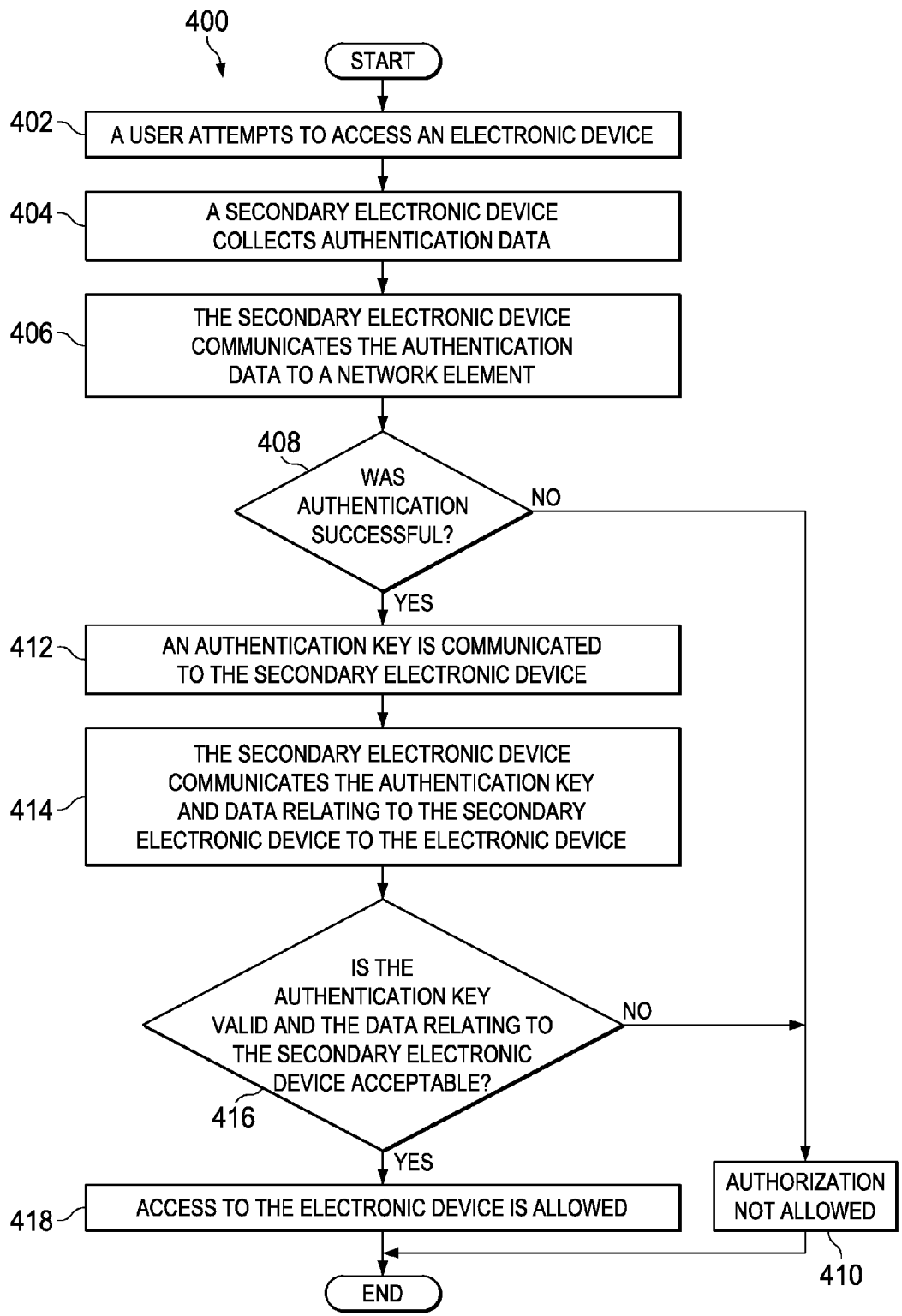
FIG. 4 is a simplified flowchart illustrating potential operations that may be associated with the communication system in accordance with an embodiment.

Turning to FIG. 4, FIG. 4 is an example flowchart illustrating possible operations of a flow 400 that may be associated with encryption key retrieval, in accordance with an embodiment. In an embodiment, one or more operations of flow 400 may be performed by verification module 122, authentication module 130, authentication data collection module 142, and network authentication modules 146a and 146b. At 402, a user attempts to access an electronic device (e.g., primary electronic device 102). At 404, a secondary electronic device (e.g., secondary electronic device 104) collects authentication data. For example, the authentication data may be a password from the user, a voice sample from the user, an iris scan of the user, a location of the user where access to the electronic device may be denied if the user is outside of an allowable area or in a restricted geographical location, a time of day where access to the electronic device may be denied if the time of day is outside an acceptable time period, etc. The authentication data can also include information about the primary electronic device or the second electronic device or both that can help the system identify the secondary electronic device. At 406, the secondary electronic device communicates the authentication data to a network element. At 408, the system determines if the authentication successful. For example, the authentication data may be compared to a whitelist or a blacklist as described above. If the authentication was not successful, then authorization to the electronic device is not allowed, as in 410. If the authentication was successful, then an authentication key is communicated to the secondary electronic device, as in 412. At 414, the secondary electronic device communicates the authentication key and data relating to the secondary electronic device to the electronic device. At 416, the system determines if the authentication key is valid and if the data relating the secondary electronic device is acceptable. If the authentication key is not valid and the data relating to the secondary electronic device is not acceptable, then authorization to the electronic device is not allowed, as in 410. If the authentication key is valid and the data relating the secondary electronic device is acceptable, then access to the electronic device is allowed, as in 418. Access to the electronic device may include allowing an OS to begin to run. In another embodiment, if the authentication key is not valid or the data regarding the secondary electronic device is not acceptable, then authorization to the electronic device is not allowed, as in 410. For example, the secondary electronic device may become compromised (e.g. due to malware) but the authentication key may be valid so the secondary electronic device can be included in a blacklist (e.g., blacklist 128) and access to the electronic device can be denied or not allowed.

Figure 5:
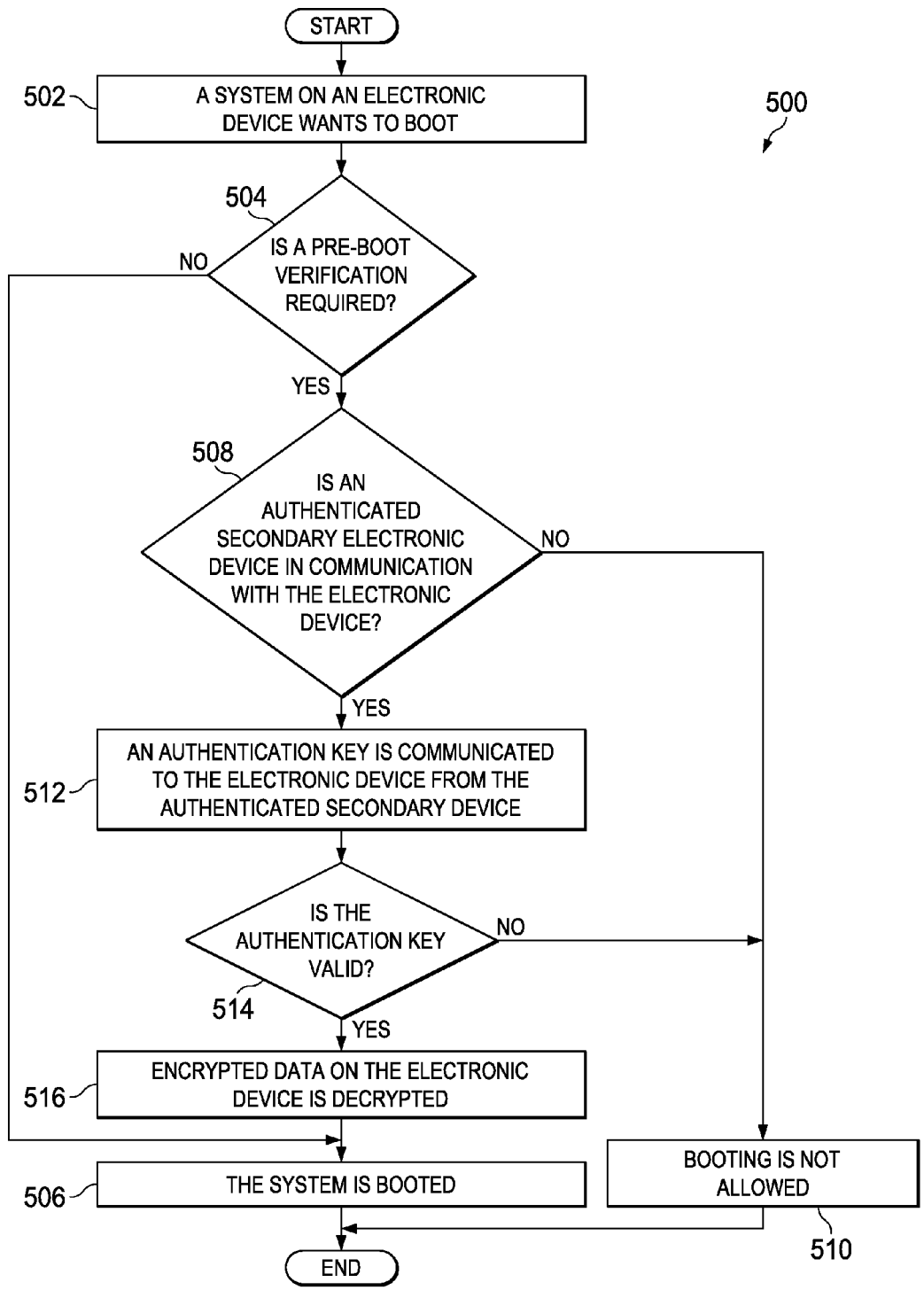
FIG. 5 is a simplified flowchart illustrating potential operations that may be associated with the communication system in accordance with an embodiment.

Turning to FIG. 5, FIG. 5 is an example flowchart illustrating possible operations of a flow 500 that may be associated with encryption key retrieval, in accordance with an embodiment. In an embodiment, one or more operations of flow 500 may be performed by verification module 122, authentication module 130, and network authentication modules 146a and 146b. At 502, a system on an electronic device wants to boot. At 504, the system determines if a pre-boot verification is required. If a pre-boot verification is not required, then the system is booted, as in 506. If a pre-boot verification is required, then the system determines if an authenticated secondary electronic device is in communication with the electronic device, as in 508. If an authenticated secondary electronic device is not in communication with the electronic device, then booting of the system is not allowed, as in 510. If an authenticated secondary electronic device is in communication with the electronic device, then an authentication key is communicated to the electronic device from the authenticated secondary electronic device, as in 512. At 514, the system determines if the authentication key is valid. For example, the secondary electronic device may have an authentication key that was once valid but has expired or may have an authentication key that is included in a blacklist because the authentication key may have become corrupted or be known to or likely to be used by a malicious device, process, or program. If the authentication key is not valid, then booting of the system is not allowed, as in 510. If the authentication key is valid, then encryption data on the electronic device is decrypted, as in 516. At 506, the system is booted.

Figure 6:
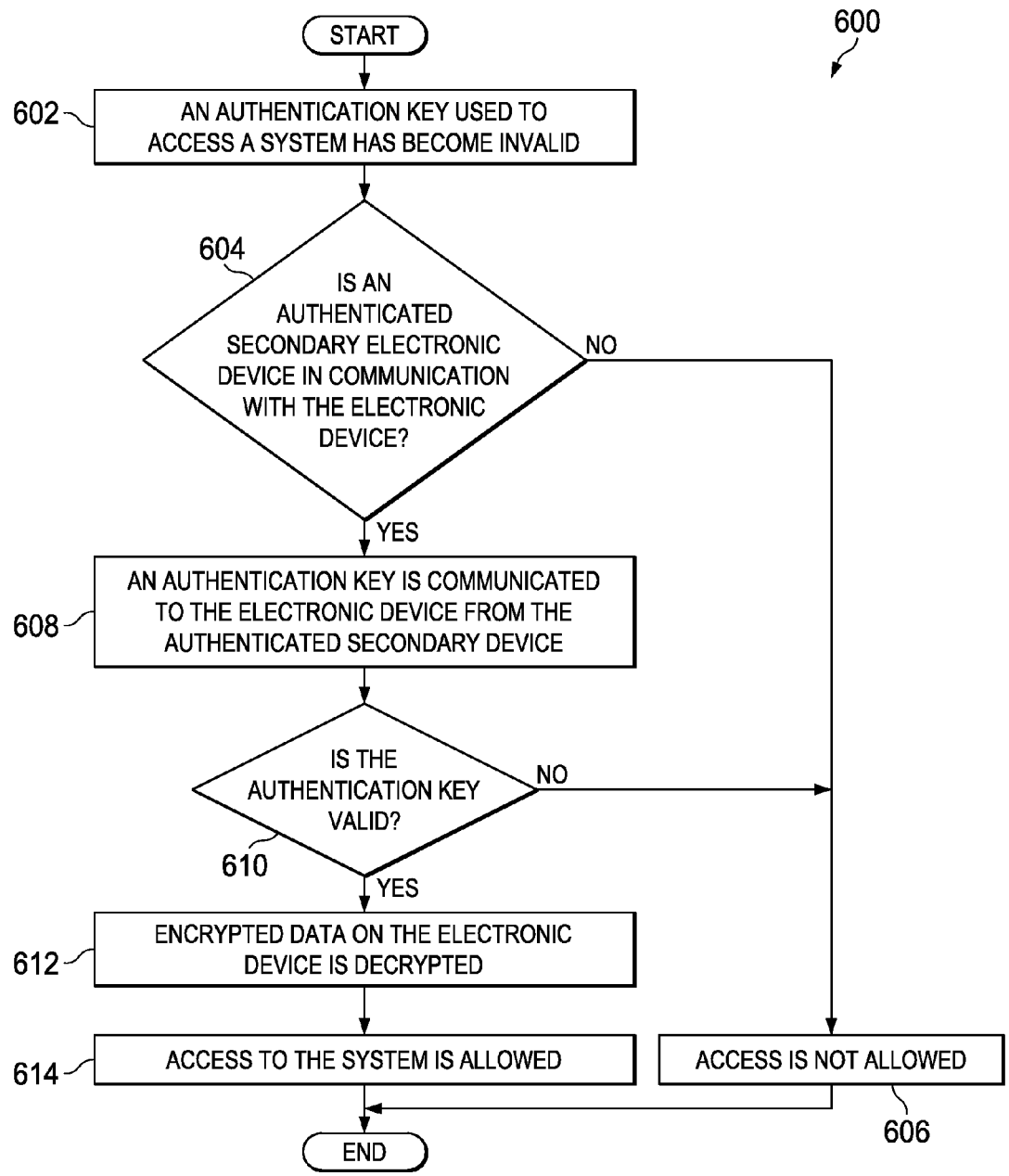
FIG. 6 is a simplified flowchart illustrating potential operations that may be associated with the communication system in accordance with an embodiment.

Turning to FIG. 6, FIG. 6 is an example flowchart illustrating possible operations of a flow 600 that may be associated with encryption key retrieval, in accordance with an embodiment. In an embodiment, one or more operations of flow 600 may be performed by verification module 122, authentication module 130, authentication data collection module 142, and network authentication modules 146a and 146b. At 602, an authentication key used to access a system has become invalid. For example, the authentication key may have expired after a predetermined amount of time or a number of uses. At 604, the system determines if an authenticated secondary electronic device is in communication with the electronic device. If an authenticated secondary electronic device is not in communication with the electronic device, then access to the system is not allowed, as in 606. If an authenticated secondary electronic device is in communication with the electronic device, then a new authentication key is communicated to the electronic device from the authenticated secondary electronic device, as in 608. At 610, the system determines if the new authentication key is valid. For example, the secondary electronic device may have an authentication key that was once valid but has also expired or may have an authentication key that is included in a blacklist because the authentication key may have become corrupted or be known to or likely to be used by a malicious device, process, or program. If the new authentication key is not valid, then access to the system is not allowed, as in 606. If the new authentication key is valid, then encryption data on the electronic device is decrypted, as in 612. At 614, access to the system is allowed.

Figure 7:
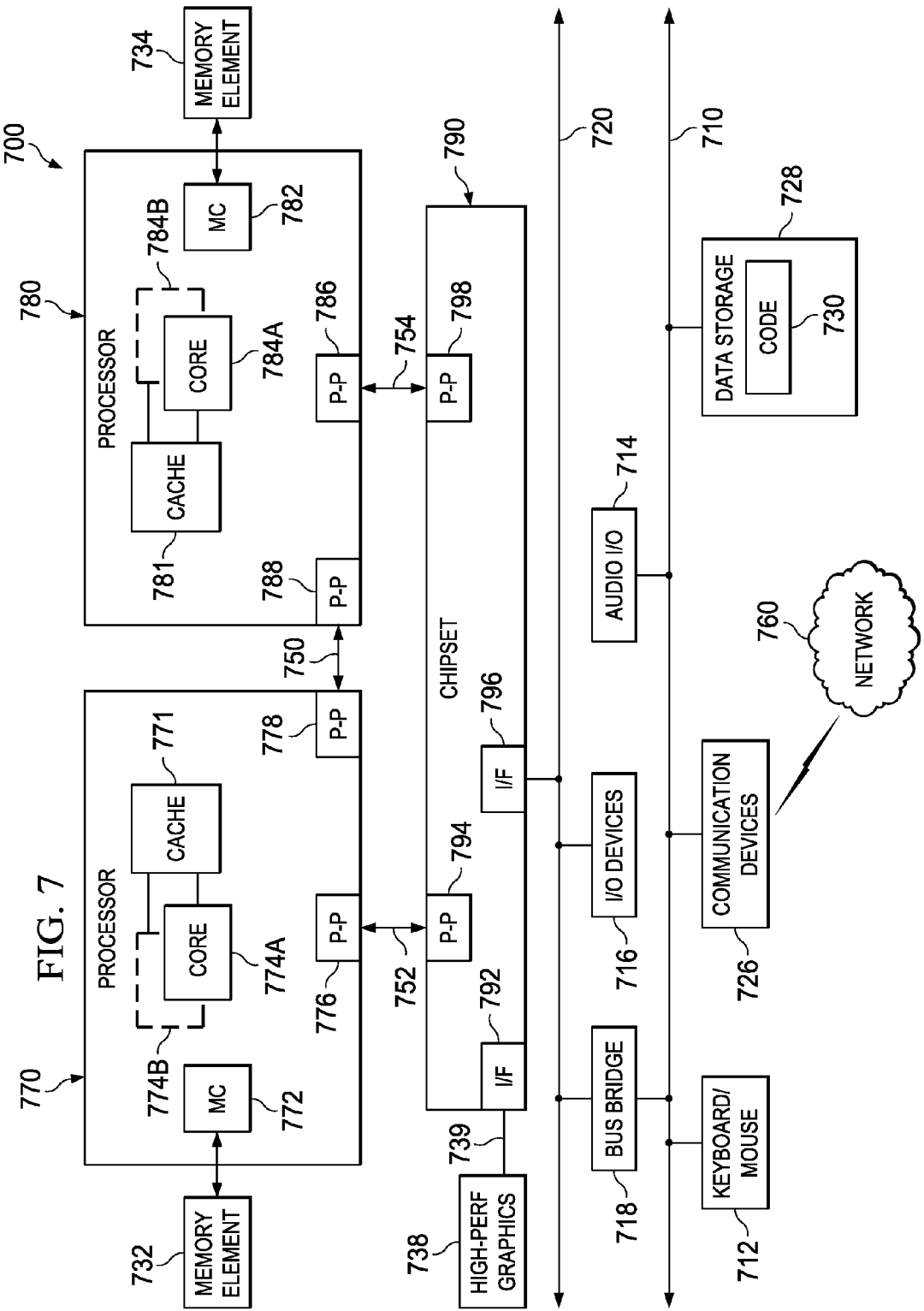
FIG. 7 is a block diagram illustrating an example computing system that is arranged in a point-to-point configuration in accordance with an embodiment.

FIG. 7 illustrates a computing system 700 that is arranged in a point-to-point (PtP) configuration according to an embodiment. In particular, FIG. 7 shows a system where processors, memory, and input/output devices are interconnected by a number of point-to-point interfaces. Generally, one or more of the network elements of communication system 100 may be configured in the same or similar manner as computing system 700.

As illustrated in FIG. 7, system 700 may include several processors, of which only two, processors 770 and 780, are shown for clarity. While two processors 770 and 780 are shown, it is to be understood that an embodiment of system 700 may also include only one such processor. Processors 770 and 780 may each include a set of cores (i.e., processor cores 774A and 774B and processor cores 784A and 784B) to execute multiple threads of a program. The cores may be configured to execute instruction code in a manner similar to that discussed above with reference to FIGS. 1-6. Each processor 770, 780 may include at least one shared cache 771, 781. Shared caches 771, 781 may store data (e.g., instructions) that are utilized by one or more components of processors 770, 780, such as processor cores 774 and 784.

Processors 770 and 780 may also each include integrated memory controller logic (MC) 772 and 782 to communicate with memory elements 732 and 734. Memory elements 732 and/or 734 may store various data used by processors 770 and 780. In alternative embodiments, memory controller logic 772 and 782 may be discrete logic separate from processors 770 and 780.

Processors 770 and 780 may be any type of processor and may exchange data via a point-to-point (PtP) interface 750 using point-to-point interface circuits 778 and 788, respectively. Processors 770 and 780 may each exchange data with a chipset 790 via individual point-to-point interfaces 752 and 754 using point-to-point interface circuits 776, 786, 794, and 798. Chipset 790 may also exchange data with a high-performance graphics circuit 738 via a high-performance graphics interface 739, using an interface circuit 792, which could be a PtP interface circuit. In alternative embodiments, any or all of the PtP links illustrated in FIG. 7 could be implemented as a multi-drop bus rather than a PtP link.

Chipset 790 may be in communication with a bus 720 via an interface circuit 796. Bus 720 may have one or more devices that communicate over it, such as a bus bridge 718 and I/O devices 716. Via a bus 710, bus bridge 718 may be in communication with other devices such as a keyboard/mouse 712 (or other input devices such as a touch screen, trackball, etc.), communication devices 726 (such as modems, network interface devices, or other types of communication devices that may communicate through a computer network 760), audio I/O devices 714, and/or a data storage device 728. Data storage device 728 may store code 730, which may be executed by processors 770 and/or 780. In alternative embodiments, any portions of the bus architectures could be implemented with one or more PtP links.

The computer system depicted in FIG. 7 is a schematic illustration of an embodiment of a computing system that may be utilized to implement various embodiments discussed herein. It will be appreciated that various components of the system depicted in FIG. 7 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 8:
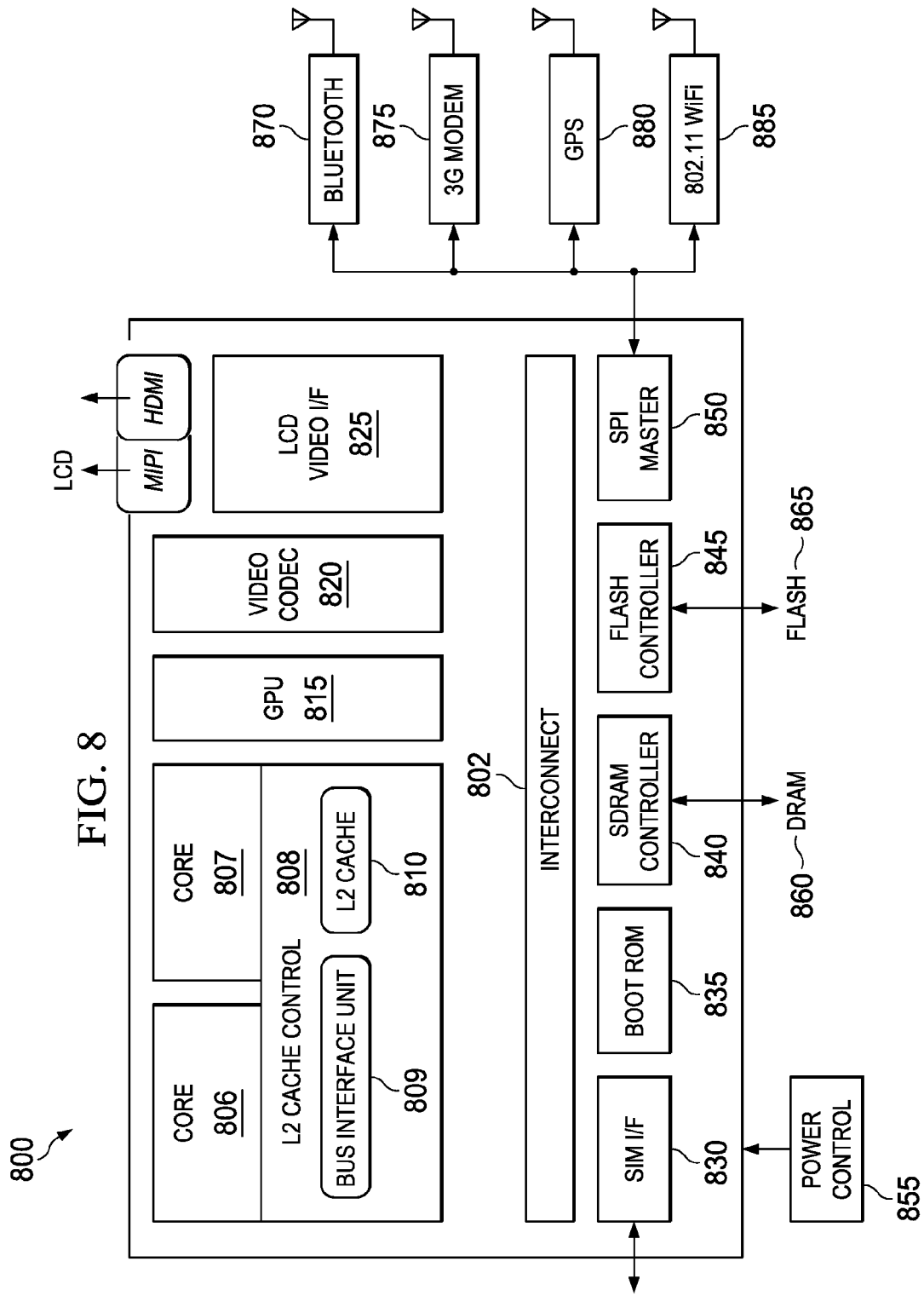
FIG. 8 is a simplified block diagram associated with an example ARM ecosystem system on chip (SOC) of the present disclosure.

Turning to FIG. 8, FIG. 8 is a simplified block diagram associated with an example ARM ecosystem SOC 800 of the present disclosure. At least one example implementation of the present disclosure can include the encryption key retrieval features discussed herein and an ARM component. For example, the example of FIG. 8 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 8, ARM ecosystem SOC 800 may include multiple cores 806-807, an L2 cache control 808, a bus interface unit 809, an L2 cache 810, a graphics processing unit (GPU) 815, an interconnect 802, a video codec 820, and a liquid crystal display (LCD) I/F 825, which may be associated with mobile industry processor interface (MIPI)/high-definition multimedia interface (HDMI) links that couple to an LCD.

ARM ecosystem SOC 800 may also include a subscriber identity module (SIM) I/F 830, a boot read-only memory (ROM) 835, a synchronous dynamic random access memory (SDRAM) controller 840, a flash controller 845, a serial peripheral interface (SPI) master 850, a suitable power control 855, a dynamic RAM (DRAM) 860, and flash 865. In addition, one or more embodiments include one or more communication capabilities, interfaces, and features such as instances of Bluetooth™ 870, a 3G modem 875, a global positioning system (GPS) 880, and an 802.11 Wi-Fi 885.

In operation, the example of FIG. 8 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 9:
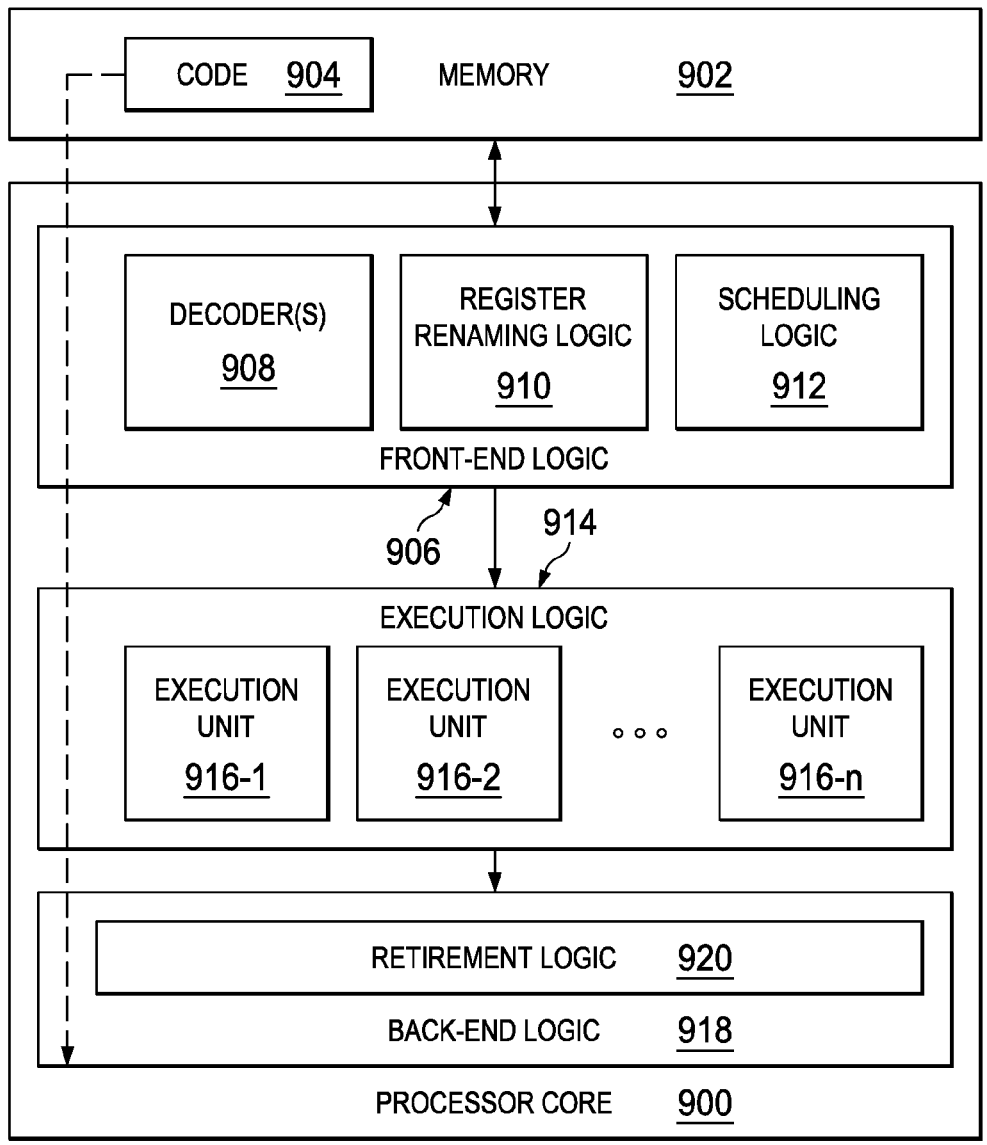
FIG. 9 is a block diagram illustrating an example processor core in accordance with an embodiment.

FIG. 9 illustrates a processor core 900 according to an embodiment. Processor core 900 may be the core for any type of processor, such as a micro-processor, an embedded processor, a digital signal processor (DSP), a network processor, or other device to execute code. Although only one processor core 900 is illustrated in FIG. 9, a processor may alternatively include more than one of the processor core 900 illustrated in FIG. 9. For example, processor core 900 represents one example embodiment of processors cores 774a, 774b, 784a, and 784b shown and described with reference to processors 770 and 780 of FIG. 7. Processor core 900 may be a single-threaded core or, for at least one embodiment, processor core 900 may be multithreaded in that it may include more than one hardware thread context (or "logical processor") per core.

FIG. 9 also illustrates a memory 902 coupled to processor core 900 in accordance with an embodiment. Memory 902 may be any of a wide variety of memories (including various layers of memory hierarchy) as are known or otherwise available to those of skill in the art. Memory 902 may include code 904, which may be one or more instructions, to be executed by processor core 900. Processor core 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 also includes register renaming logic 910 and scheduling logic 912, which generally allocate resources and queue the operation corresponding to the instruction for execution.

Processor core 900 can also include execution logic 914 having a set of execution units 916-1 through 916-N. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor core 900 allows out of order execution but requires in order retirement of instructions. Retirement logic 920 may take a variety of known forms (e.g., re-order buffers or the like). In this manner, processor core 900 is transformed during execution of code 904, at least in terms of the output generated by the decoder, hardware registers and tables utilized by register renaming logic 910, and any registers (not shown) modified by execution logic 914.

Although not illustrated in FIG. 9, a processor may include other elements on a chip with processor core 900, at least some of which were shown and described herein with reference to FIG. 7. For example, as shown in FIG. 7, a processor may include memory control logic along with processor core 900. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and their teachings are readily scalable and can accommodate a large number of components, as well as more complicated/sophisticated arrangements and configurations. Accordingly, the examples provided should not limit the scope or inhibit the broad teachings of communication system 100 and as potentially applied to a myriad of other architectures.

It is also important to note that the operations in the preceding flow diagrams (i.e., FIGS. 4-6) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 have been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable storage medium having one or more instructions that when executed by at least one processor, cause the at least one processor to receive a request to access an electronic device, collect authentication data at a secondary electronic device, where the secondary electronic device is separate from the electronic device, verify the authentication data, receive an authentication key from a network element, and communicate the authentication key to the electronic device.

In Example C2, the subject matter of Example C1 can optionally include where the authentication data is verified by the secondary electronic device.

In Example C3, the subject matter of any one of Examples C1-C2 can optionally include where the authentication data includes authentication information about a user of the electronic device and about the secondary electronic device.

In Example C4, the subject matter of any one of Examples C1-C3 can optionally include where the authentication data is verified by the network element.

In Example C5, the subject matter of any one of Examples C1-C4 can optionally include where a primary function of the secondary electronic device does not include receiving the authentication key.

In Example C6, the subject matter of any one of Example C1-05 can optionally include where the authentication key expires after a predetermined amount of time.

In Example C7, the subject matter of any one of Examples C1-C6 can optionally include where the authentication key is used to access protected data on the electronic device.

In Example C8, the subject matter of any one of Examples C1-C7 can optionally include where the authentication key is used to access pre-operating system protected data on the electronic device.

In Example A1, an electronic device can include a verification module, where the verification module is configured to request an authentication key from a secondary electronic device, receive the authentication key from the secondary electronic device, and verify the authentication key and the secondary electronic device.

In Example, A2, the subject matter of Example A1 can optionally include where the verification module accesses a whitelist and a blacklist to verify the secondary electronic device.

In Example A3, the subject matter of any one of Examples A1-A2 can optionally include where the secondary electronic device is physically separate from the electronic device.

In Example A4, the subject matter of any one of Examples A1-A3 can optionally include where the authentication key is used to access protected data on the electronic device.

In Example A5, the subject matter of any one of Examples A1-A4 can optionally include where the authentication key is used to access pre-operating system protected data on the electronic device.

In Example A6, the subject matter of any one of Examples A1-A5 can optionally include where the authentication key expires after a predetermined amount of time.

In Example A7, the subject matter of any one of Examples A1-A6 can optionally include where the secondary electronic device receives the authentication key from a network element.

In Example A8, the subject matter of any one of Examples A1-A7 can optionally include where the authentication key is required for pre-boot authorization.

Example M1 is a method including receiving a request to access an electronic device that is separate from a secondary electronic device, collecting authentication data at the secondary electronic device, verifying the authentication data, receiving an authentication key from a network element, and communicating the authentication key to the electronic device.

In Example M2, the subject matter of Example M1 can optionally include where the authentication data includes authentication information about a user of the electronic device and about the secondary electronic device.

In Example M3, the subject matter of any one of the Examples M1-M2 can optionally include where the authentication data is verified by the network element.

In Example M4, the subject matter of any one of the Examples M1-M3 can optionally include where verifying the authentication data includes comparing the authentication data to a whitelist and a black list.

In Example M5, the subject matter of any one of the Examples M1-M4 can optionally include where the authentication key is used to access protected data on the electronic device.

In Example M6, the subject matter of any one of the Examples M1-M5 can optionally include where the authentication key is used to access pre-operating system protected data on the electronic device.

In Example M7, the subject matter of any one of the Examples M1-M6 can optionally include where the authentication key is required for pre-boot authorization.

Example S1 is a system for receiving an authentication key, the system including an authentication module configured for receiving a request to access an electronic device, wherein the electronic device is separate from the authentication module, collecting authentication data, communicating the authentication data to a network element, receiving an authentication key, and communicating the authentication key to the electronic device.

In Example S2, the subject matter of Example S1 can optionally include where the authentication data includes authentication information about a user of the electronic device and about a secondary electronic device that includes the authentication module.

Example X1 is a machine-readable storage medium including machine-readable instructions to implement a method or realize an apparatus as in any one of the Examples A1-A8, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one computer-readable medium comprising one or more instructions that when executed by at least one processor, cause the at least one processor to:
   receive a request to access an electronic device;
   collect authentication data at a secondary electronic device, wherein the secondary electronic device is separate from the electronic device;
   verify the authentication data;
   receive an authentication key from a network element that is physically separate from the electronic device and the secondary electronic device; and
   communicate the authentication key to the electronic device, wherein the authentication key is not persistently stored in the electronic device and the secondary electronic device, wherein the electronic device requires pre-boot authentication before an operating system on the electronic device is allowed to run and the authentication key provides the pre-boot verification.

2. The at least one computer-readable medium of claim 1, wherein the authentication data is verified by the secondary electronic device.

3. The at least one computer-readable medium of claim 1, wherein the authentication data includes authentication information about a user of the electronic device and about the secondary electronic device, wherein the authentication data is verified by the network element.

4. The at least one computer-readable medium of claim 1, wherein a primary function of the secondary electronic device does not include receiving the authentication key.

5. The at least one computer-readable medium of claim 1, wherein the authentication key expires after a predetermined amount of time or a predetermined number of uses.

6. The at least one computer-readable medium of claim 1, wherein the authentication key is used to access protected data on the electronic device.

7. The at least one computer-readable medium of claim 1, wherein the authentication key is used to access pre-operating system protected data on the electronic device.

8. An electronic device comprising:
   a hardware processor; and
   a verification engine configured to:
      request an authentication key from a secondary electronic device, wherein the secondary electronic device previously received the authentication key from a network element that is physically separate from the electronic device and the secondary electronic device;
      receive the authentication key from the secondary electronic device, wherein the secondary electronic device is separate from the electronic device; and
      verify the authentication key and the secondary electronic device, wherein the authentication key is not persistently stored in the electronic device and the secondary electronic device, wherein the electronic device requires pre-boot authentication before an operating system on the electronic device is allowed to run and the authentication key provides the pre-boot verification.

9. The electronic device of claim 8, wherein the verification engine accesses a whitelist and a blacklist to verify the secondary electronic device.

10. The electronic device of claim 8, wherein the secondary electronic device is physically separate from the electronic device.

11. The electronic device of claim 8, wherein the authentication key is used to access protected data on the electronic device.

12. The electronic device of claim 8, wherein the authentication key is used to access pre-operating system protected data on the electronic device and the authentication key expires after a predetermined amount of time.

13. The electronic device of claim 8, wherein the secondary electronic device receives the authentication key from a network element.

14. The electronic device of claim 8, wherein the authentication key is required for pre-boot authorization.

15. A method comprising:
   receiving a request to access an electronic device that is separate from a secondary electronic device;
   collecting authentication data at the secondary electronic device;
   verifying the authentication data;

receiving an authentication key from a network element that is physically separate from the electronic device and the secondary electronic device; and communicating the authentication key to the electronic device, wherein the authentication key is not persistently stored in the electronic device and the secondary electronic device, wherein the electronic device requires pre-boot authentication before an operating system on the electronic device is allowed to run and the authentication key provides the pre-boot verification.

16. The method of claim 15, wherein the authentication data includes authentication information about a user of the electronic device and about the secondary electronic device.

17. The method of claim 15, wherein the authentication data is verified by the network element.

18. The method of claim 15, wherein verifying the authentication data includes comparing the authentication data to a whitelist and a blacklist.

19. The method of claim 15, wherein the authentication key is used to access protected data on the electronic device.

20. The method of claim 15, wherein the authentication key is used to access pre-operating system protected data on the electronic device.

21. The method of claim 15, wherein the authentication key is required for pre-boot authorization.

22. A system for receiving an authentication key, the system comprising:

a hardware processor; and an authentication engine configured for:

receiving a request to access an electronic device, wherein the electronic device is separate from the authentication module;

collecting authentication data;

communicating the authentication data to a network element that is physically separate from the electronic device and the secondary electronic device;

receiving an authentication key; and communicating the authentication key to the electronic device, wherein the authentication key is not persistently stored in the electronic device and the secondary electronic device, wherein the electronic device requires pre-boot authentication before an operating system on the electronic device is allowed to run and the authentication key provides the pre-boot verification.

23. The system of claim 22, wherein the authentication data includes authentication information about a user of the electronic device and about a secondary electronic device that includes the authentication engine.

24. The at least one computer-readable medium of claim 1, wherein the authentication key must be reacquired each time the electronic device restarts.

* * * * *